(12) United States Patent
Sato (10) Patent No.: US 9,346,326 B2
(45) Date of Patent: May 24, 2016

(54) PNEUMATIC TIRE (71) Applicant: Toyo Tire & Rubber Co., Ltd., Osaka-shi, Osaka (JP)

(72) Inventor: Yoshiki Sato, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 223 days.

(21) Appl. No.: 14/078,711

(22) Filed: Nov. 13, 2013

(65) Prior Publication Data
US 2014/0158262 A1 Jun. 12, 2014

(30) Foreign Application Priority Data
Dec. 10, 2012 (JP) .................. 2012-269450

(51) Int. Cl.
B60C 11/13 (2006.01)
B60C 11/03 (2006.01)

(52) U.S. Cl.
CPC ......... B60C 11/1307 (2013.04); B60C 11/0306 (2013.04); B60C 2011/133 (2013.04)

(58) Field of Classification Search
CPC ............ B60C 11/1307; B60C 11/1281; B60C 11/0323; B60C 2011/133; B60C 2011/1268
See application file for complete search history.

(56) References Cited

U.S. PATENT DOCUMENTS

| | | | | |
|---|---|---|---|---|
| 6,283,184 B1 * | 9/2001 | Tomita | ............... | B60C 11/00 152/209.18 |
| 6,668,886 B1 * | 12/2003 | Iwamura | ............ | B60C 11/12 152/209.18 |
| 7,543,617 B2 * | 6/2009 | Matsumoto | ............ | B60C 11/13 152/209.21 |
| 8,302,645 B2 * | 11/2012 | Takahashi | ............ | B60C 11/0309 152/209.17 |
| 8,413,696 B2 * | 4/2013 | Doan | ................ | B60C 11/0309 152/209.18 |
| 8,439,093 B2 * | 5/2013 | Takahashi | ............ | B60C 11/0306 152/209.17 |
| 8,857,252 B2 * | 10/2014 | Lamb | ................ | B60C 11/24 73/146 |
| 2009/0242090 A1 | 10/2009 | Ibaraki | | |

FOREIGN PATENT DOCUMENTS

CN 101357567 A 2/2009
CN 101544163 A 9/2009
(Continued)

OTHER PUBLICATIONS

English machine translation of JP2005-193815, dated Jul. 2005.*
(Continued)

Primary Examiner — Steven D Maki
Assistant Examiner — Robert Dye
(74) Attorney, Agent, or Firm — Westerman, Hattori, Daniels & Adrian, LLP (57) ABSTRACT Provided is a pneumatic tire where a plurality of main grooves extending along the tire circumferential direction, lateral grooves extending in the direction inclined with respect to the tire width direction, and land portions partitioned by the main grooves and the lateral grooves are formed in a tread portion. The land portion includes an obtuse angle portion defined at an obtuse angle by the main groove and the lateral groove, and an acute angle portion defined at an acute angle by the main groove and the lateral groove. A plurality of holes are formed in a side wall of the land portion facing the main groove at intervals in the tire circumferential direction. The holes formed on an obtuse angle portion side are arranged at positions closer to a ground contact surface of the land portion than the holes formed on an acute angle portion side.

8 Claims, 5 Drawing Sheets (56) References Cited

FOREIGN PATENT DOCUMENTS

| EP | 0590375 | * | 4/1994 |
| JP | 10-315711 A | | 12/1998 |
| JP | 2005-193815 | * | 7/2005 |

OTHER PUBLICATIONS

English machine translation of EP0590375, dated Apr. 1994.*
Office Acton dated Dec. 1, 2015, issued in counterpart Chinese Patent Application No. 201310653138.7, with English translation. (13 pages).

* cited by examiner

PNEUMATIC TIRE

BACKGROUND OF THE INVENTION

1. Field of the Invention

THE present invention relates to a pneumatic tire.

2. Description of the Related Art

With respect to a pneumatic tire, there has been known a pneumatic tire where land portions partitioned by main grooves extending in the tire circumferential direction and lateral grooves which intersect with the main grooves are formed on a surface of a tread portion. The tire provided with such grooves on the tread portion generates a pattern noise from a space formed between the tire and a road surface during traveling. Particularly, an air columnar resonance sound (approximately 800 Hz to 1250 Hz) attributed to the main grooves is a main cause of such a pattern noise.

The principle on generation of such an air columnar resonance sound is as follows. That is, when a tire is brought into contact with a ground, the main groove is deformed so that a volume of the main groove changes whereby air confined in the main groove repeats compression and expansion. Due to such repetition of compression and expansion, a pumping sound, that is, an air columnar resonance sound is generated from a space in the main groove which is in contact with a ground. At this point of time, the higher a pumping pressure of air in the main groove becomes, the larger an air columnar resonance sound becomes.

To reduce such an air columnar resonance sound, it is effective to decrease a flow speed of air which passes through the space formed in the main groove which is in contact with the ground.

In view of the above, for example, JP-A-10-315711 (kokai) discloses a technique where a plurality of holes are formed in a side wall of a land portion facing a main groove along the tire circumferential direction so that friction resistance between the side wall of the land portion facing the main groove and air is increased whereby a flow speed of air which passes through the main groove is decreased thus suppressing the generated air columnar resonance sound.

SUMMARY OF THE INVENTION

In designing a tread pattern of a pneumatic tire, to enhance drainage of water, a technique is adopted in general where lateral grooves are inclined in the direction that the lateral grooves approach the circumferential direction from the tire width direction.

However, when the lateral grooves are inclined with respect to the tire width direction, an acute angle portion where the main groove and the lateral groove intersect with each other at an acute angle and an obtuse angle portion where the main groove and the lateral groove intersect with each other at an obtuse angle are formed on the land portion. Accordingly, large difference in rigidity is generated between an acute angle portion side and an obtuse angle portion side on the land portion thus giving rise to a drawback that heel-and-toe wear where the tire wears in a serrated manner in the circumferential direction is liable to be generated.

The present invention has been made in view of the above-mentioned drawbacks, and it is an object of the present invention to provide a pneumatic tire where lateral grooves are inclined with respect to the tire width direction which can suppress heel-and-toe wear while decreasing an air columnar resonance sound.

According to one aspect of the present invention, there is provided a pneumatic tire provided with a plurality of main grooves extending along the tire circumferential direction, lateral grooves extending in the direction inclined with respect to the tire width direction, and land portions partitioned by the main grooves and the lateral grooves on a tread portion, wherein the land portion includes an obtuse angle portion defined at an obtuse angle by the main groove and the lateral groove, and an acute angle portion defined at an acute angle by the main groove and the lateral groove, a plurality of holes are formed in a side wall of the land portion facing the main groove at intervals in the tire circumferential direction, and the holes formed on an obtuse angle portion side are arranged at positions closer to a ground contact surface of the land portion than the holes formed in an acute angle portion side.

DETAILED DESCRIPTION OF THE INVENTION

[First Embodiment]

Although not shown in the drawing, a pneumatic tire of this embodiment includes: a pair of left and right bead portions and a pair of left and right side wall portions; and a tread portion 10 which is provided between both side wall portions such that the tread portion 10 connects radially outer end portions of the left and right side wall portions to each other. The pneumatic tire includes a carcass which extends between the pair of bead portions.

The carcass is formed of at least one carcass ply which extends to the bead portions from the tread portion 10 via the side wall portions, and has both end portions thereof engaged with bead cores which are embedded in the bead portions respectively. The carcass is provided for reinforcing the above-mentioned respective parts.

A belt formed of a steel cord layer covered with two or more rubber layers is provided to an outer peripheral side of the carcass in the tread portion 10. The belt reinforces the tread portion 10 on an outer periphery of the carcass.

Figure 1:
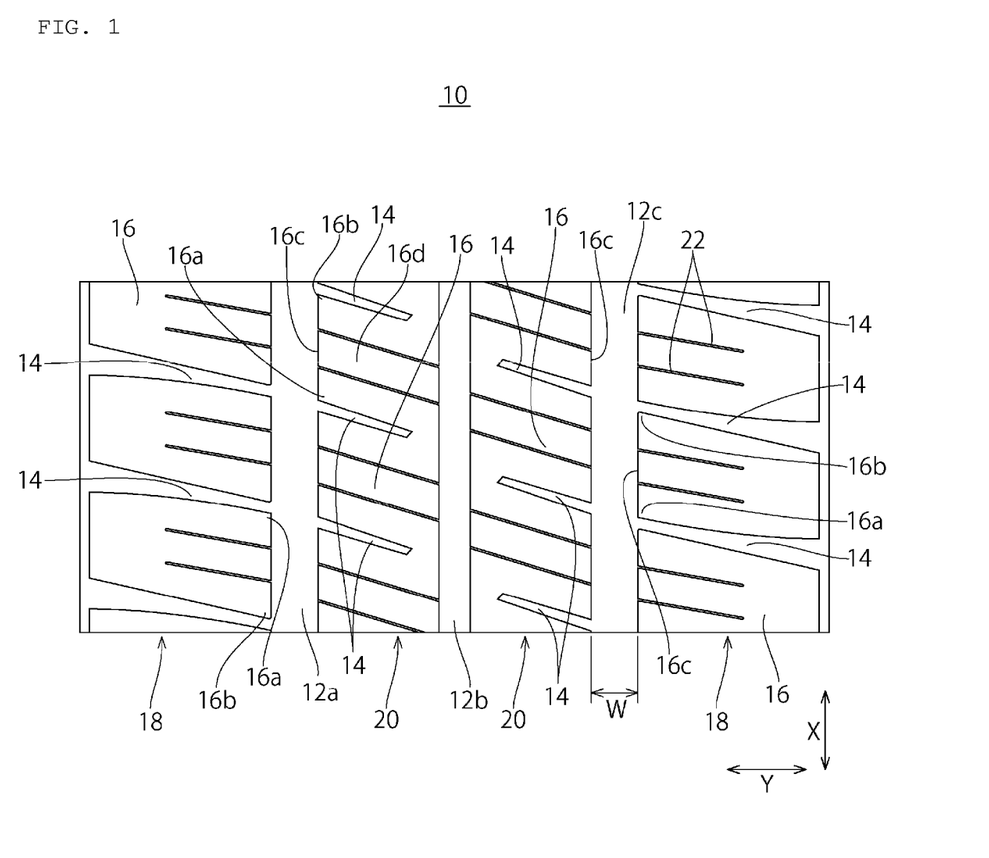
FIG. 1 is a developed plan view of a tread pattern of a pneumatic tire according to a first embodiment of the present invention.

On a surface of the tread portion 10, as shown in FIG. 1, a plurality of main grooves 12 which extend straight in the tire circumferential direction X and a plurality of lateral grooves 14 which intersect with the main grooves 12 are formed. Due to such a constitution, the tread portion 10 includes a plurality of land portions 16 partitioned by the main grooves 12 and the lateral grooves 14.

In this embodiment, three main grooves 12a, 12b, 12c are formed parallel to each other in the tire width direction Y. Due to such a constitution, the tread portion 10 is partitioned into four regions consisting of shoulder regions 18 which are positioned outside the outer main grooves 12a, 12c respectively in the tire width direction, and center regions 20 which are sandwiched between the shoulder regions 18 and are divided from each other in the tire width direction Y by the center main groove 12b.

In the shoulder regions 18 and the center regions 20, the lateral grooves 14 are formed parallel to each other in the tire circumferential direction X at predetermined intervals. The lateral grooves 14 extend toward a center portion from an outer edge of the tread portion 10 in the tire width direction Y in an inclined manner with respect to the tire width direction Y, intersect with the main grooves 12a, 12c positioned on outer sides of the tread portion 10, and terminate in the middle of the center regions 20.

Due to such a constitution, in the shoulder region 18, a large number of blocks which are divided from each other by the lateral grooves 14 in the tire circumferential direction X are arranged parallel to each other thus forming the land portions 16. In the center region 20, the rib-shaped land portion 16 is formed in such a state where an outer side of the land portion 16 is arranged in the tire width direction Y in a divided manner by the lateral grooves 14, and an inner side of the land portion 16 is formed contiguously in the tire width direction Y.

In the land portions 16 formed in the shoulder regions 18 and the center regions 20, two sipes 22 which extend approximately parallel to the lateral grooves 14 are formed between the lateral grooves 14 adjacent to each other in the tire circumferential direction X.

The lateral grooves 14 which partition the land portion 16 in the tire circumferential direction X extend in the direction in an inclined manner with respect to the tire width direction Y and hence, the land portion 16 has an obtuse angle portion 16a and an acute angle portion 16b. The obtuse angle portion 16a is a corner portion of the land portion 16 facing the outer main groove 12a, 12c which intersects with the lateral groove 14, and is also a corner portion defined at an obtuse angle by the main groove 12a, 12c and the lateral groove 14. The acute angle portion 16b is a corner portion of the land portion 16 facing the outer main groove 12a, 12c which intersects with the lateral groove 14, and is also a corner portion defined at an acute angle by the main groove 12a, 12c and the lateral groove 14.

Figure 2:
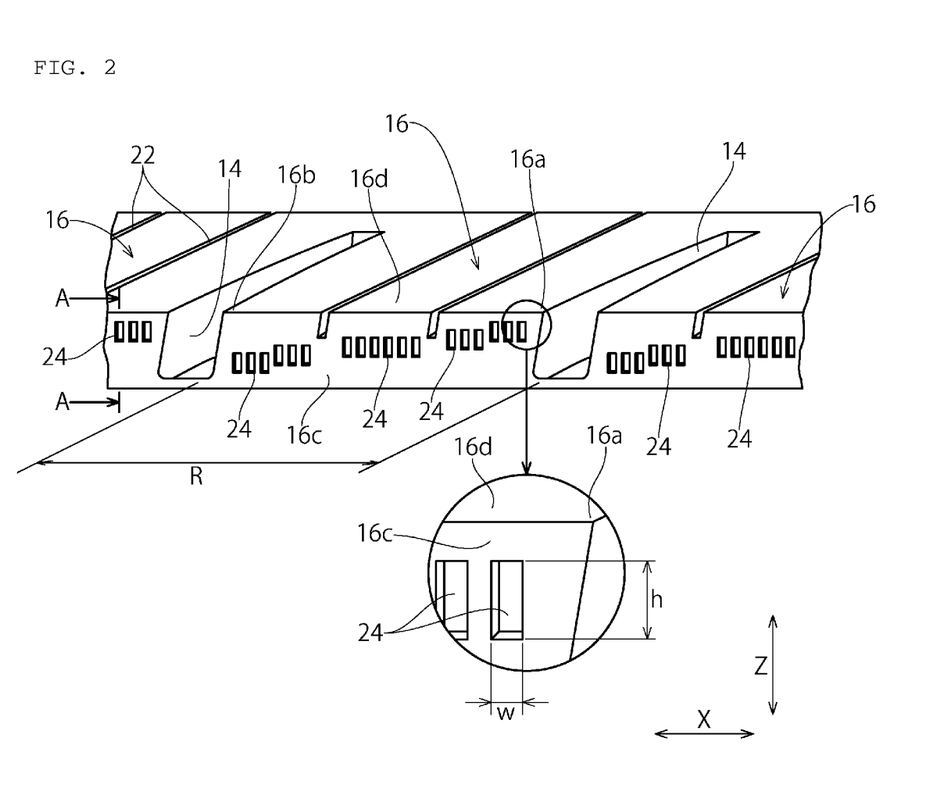
FIG. 2 is a perspective view of land portions of the pneumatic tire shown in FIG. 1.

As shown in FIG. 2, on a side wall 16c of the land portion 16 facing the outer main groove 12a, 12c, holes 24 having an elongated hole shape whose size in the depth direction Z of the main groove 12a, 12c is larger than a size thereof in the tire circumferential direction X are formed.

In a region R of the land portion 16 sandwiched between the lateral grooves 14 which are adjacent to each other in the tire circumferential direction X, a plurality of holes 24 are formed at intervals in the tire circumferential direction X. In the region R of the land portion 16, the holes 24 formed on an obtuse angle portion 16a side are arranged at positions closer to a ground contact surface 16d of the land portion 16 than the holes 24 formed on an acute angle portion 16b side. The holes 24 are formed so as to avoid positions where the holes 24 overlap with the sipes 22 in the tire circumferential direction, and the hole 24 is not formed below the sipe 22.

In this embodiment, the holes 24 arranged adjacent to each other in the tire circumferential direction X at least partially overlap with each other in the depth direction Z of the main groove 12a, 12c.

Figure 4A:
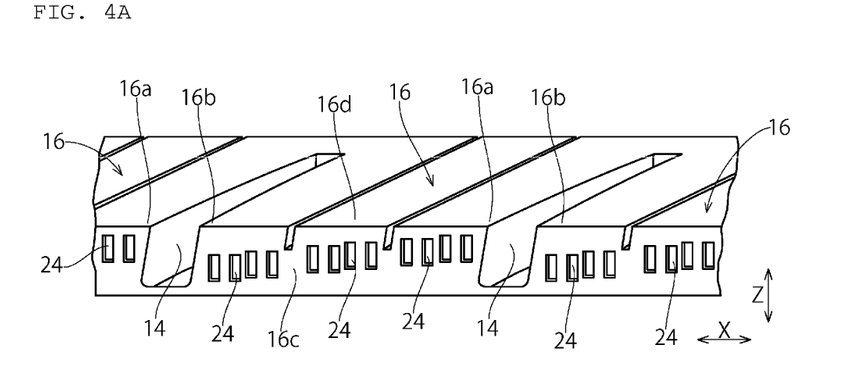
FIG. 4A is a perspective view of land portions of a pneumatic tire according to a modification of the present invention.

As shown in FIG. 2 or FIG. 4A, among the plurality of holes 24, some holes 24 arranged adjacent to each other in the tire circumferential direction X may be arranged at the same position in the depth direction Z of the main groove 12a, 12c. Alternatively, as shown in FIG. 4B and FIG. 4C, among the plurality of holes 24, the holes 24 may be arranged such that positions of the holes 24 gradually approach the ground contact surface 16d in the direction from the acute angle portion 16b of the land portion 16 to the obtuse angle portion 16a of the land portion 16.

Figure 4B:
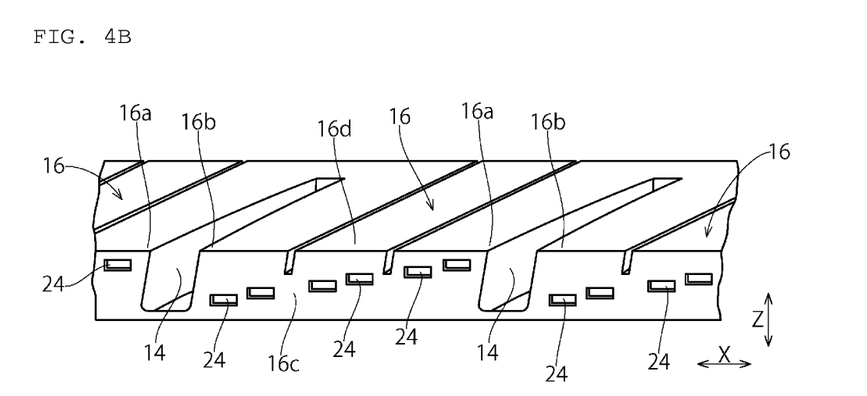
FIG. 4B is a perspective view of the land portions of the pneumatic tire according to another modification of the present invention.
Figure 4C:
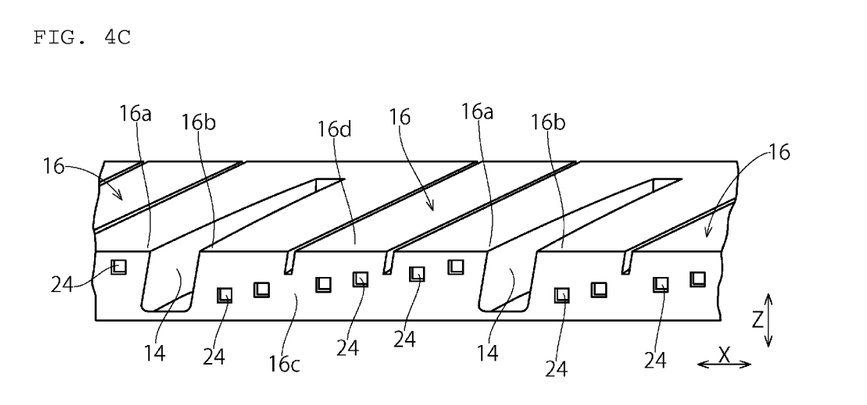
FIG. 4C is a perspective view of the land portions of the pneumatic tire according to still another modification of the present invention.

Although the explanation has been made with respect to the case where the holes 24 have an elongated hole shape which elongates in the depth direction Z in this embodiment, for example, the holes 24 may have an elongated hole shape whose size in the tire circumferential direction X is larger than a size thereof in the depth direction Z as shown in FIG. 4B, or may have a square shape as shown in FIG. 4C.

Figure 3:
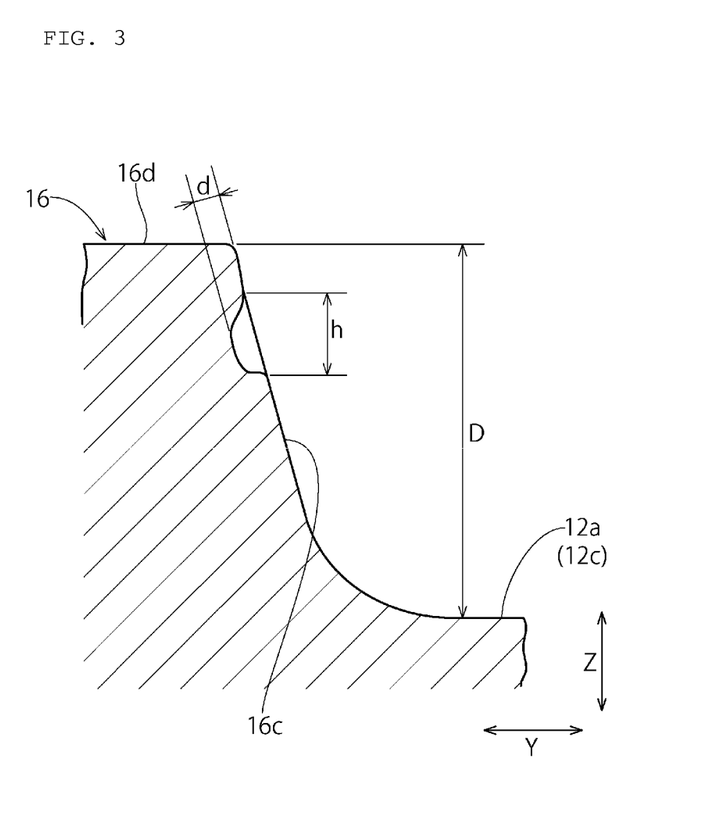
FIG. 3 is a cross-sectional view taken along a line A-A in FIG. 2.

One example of various sizes of the holes 24 formed in the side wall 16c of the land portion 16 based on FIG. 1 to FIG. 3 is exemplified. Assuming that the main groove 12a, 12c have a width W of 10 mm and a depth D of 10 mm, the hole 24 may have a height (that is, a length along the depth direction Z) h of 1.0 to 3.0 mm, a width (that is, a length along the tire circumferential direction X) w of 0.6 to 3.0 mm, and a depth (a length from the side wall 16c of the land portion 16 to a bottom portion of the hole 24) d of 0.3 to 2.0 mm.

To consider the case where the height h of the hole 24 is smaller than 1.0 mm, the case where the width w of the hole 24 is smaller than 0.6 mm, and the case where the depth d of the hole 24 is smaller than 0.3 mm, an amount of rigidity reduction caused by the holes 24 is small so that it is difficult to make the difference in rigidity in the inside of the land portion 16 uniform, and frictional resistance cannot be sufficiently imparted to air which flows through the main groove 12a, 12c and hence, it is difficult to reduce an air columnar resonance sound. On the other hand, to consider that the case where the height h of the hole 24 is larger than 3.0 mm, the case where the width w of the hole 24 is larger than 3.0 mm, and the case where the depth d of the hole 24 is larger than 2.0 mm, besides lowering of a drainage performance of the main groove 12a, 12c, the size of the hole 24 becomes excessively large and hence, it is difficult to impart difference in rigidity between the obtuse angle portion 16a side and the acute angle portion 16b side whereby it is difficult to adjust the rigidity in the land portion 16 uniform.

A ratio (T/S) of a total opening area T consisting of areas of the holes 24 formed in the side wall 16c of the land portion 16 to an area S of the side wall 16c of the land portion 16 in which the plurality of holes 24 are formed is preferably set to a value which falls within a range of 0.03 or more and 0.2 or less.

In the pneumatic tire having the above-mentioned constitution, the holes 24 formed on the obtuse angle portion 16a side of the land portion 16 are arranged at positions closer to the ground contact surface 16d of the land portion 16 than the holes 24 formed on the acute angle portion 16b side of the land portion 16. Due to such a constitution, on the obtuse angle portion 16a side, frictional resistance between the side wall 16c of the land portion 16 and air can be increased while lowering rigidity of the land portion 16. On the other hand, on the acute angle portion 16b side, frictional resistance between the side wall of the land portion and air can be increased while suppressing the lowering of rigidity of the land portion 16. As a result, an air columnar resonance sound can be suppressed and, at the same time, heel-and-toe wear can be also suppressed by reducing difference in rigidity of the land portion 16 between the obtuse angle portion 16a side and the acute angle portion 16b side.

Each hole 24 formed in the side wall 16c of the land portion 16 is arranged in an overlapping manner in the depth direction Z of the main groove 12a, 12c with at least a portion of the hole 24 arranged adjacent to the hole 24 in the tire circumferential direction X. Accordingly, rigidity of the land portion 16 can be gradually changed from the obtuse angle portion 16a side to the acute angle portion 16b side so that the difference in rigidity in the land portion 16 can be uniformly adjusted easily.

The hole 24 has an elongated hole shape whose size in the depth direction Z of the main groove 12a, 12c is larger than a size thereof in the tire circumferential direction X and hence, the hole 24 can be arranged in an overlapping manner in the depth direction Z with the hole 24 arranged adjacent to the hole 24 in the tire circumferential direction X, and an amount of adjustment (an amount of change in rigidity) in adjusting rigidity in the land portion 16 can be increased so that the difference in rigidity in the land portion 16 can be uniformly adjusted easily.

(Another Embodiment)

In the above-mentioned embodiment, the explanation has been made with respect to the case where the plurality of holes 24 are formed at positions different from each other in the depth direction Z on the rib-shaped land portion 16 where the land portion 16 is formed continuously on an inner side thereof in the tire width direction Y. However, in the same manner as the rib-shaped land portion 16, a plurality of holes 24 may be formed in the side walls 16c of the block-shaped land portions 16 facing the main groove 12a, 12c (for example, the land portions formed in the shoulder region 18) which are divided by the lateral grooves 14 in the tire circumferential direction X in such a manner that the holes 24 formed on the obtuse angle portion 16a side are arranged closer to the ground contact surface 16d of the land portion 16 than the holes 24 formed on the acute angle portion 16b side.

According to the present invention, various other modifications are conceivable without departing from the gist of the present invention although the respective modifications are not enumerated here.

EXAMPLES

Hereinafter, the explanation is made with respect to examples and the like to specifically exhibit the constitution and advantageous effects of the present invention. A test tire (size: 195/60R15, rim: 6J) was mounted on an actual vehicle (sedan-type vehicle car made in Japan with displacement of 2000 cc), and the performance evaluation was made. The evaluation method is as follows.

(1) Uneven Wear Resistance Performance (Heel-and-Toe Wear Amount)

A vehicle which travelled on a local road by 10000 km was subjected to the performance test. An amount of wear step between the obtuse angle portion 16a of the land portion 16 and the acute angle portion 16b of the land portion 16 was measured, and the inverse number of the wear step is indicated by an index where the inverse number of an amount of wear step of a comparative example 1 is set to 100. The evaluation is made such that the larger the indicated numerical value becomes, the smaller a heel-and-toe wear amount becomes so that the tire has the excellent uneven wear resistance performance.

(2) Noise Performance (Air Columnar Resonance Sound)

The level of an air columnar resonance sound of 1 kHz in a ⅓ octave band was measured in a bench test in accordance with JASO C606 (velocity: 80km/h) using a new tire. The sound pressure level was converted into an energy value. The inverse number of the energy value was indicated by an index where the inverse number of the energy value of the comparative example 1 is set to 100. The evaluation was made such that the larger the numerical value becomes, the smaller the air columnar resonance sound becomes so that the pneumatic tire exhibits excellent noise performance.

Figure 5A:
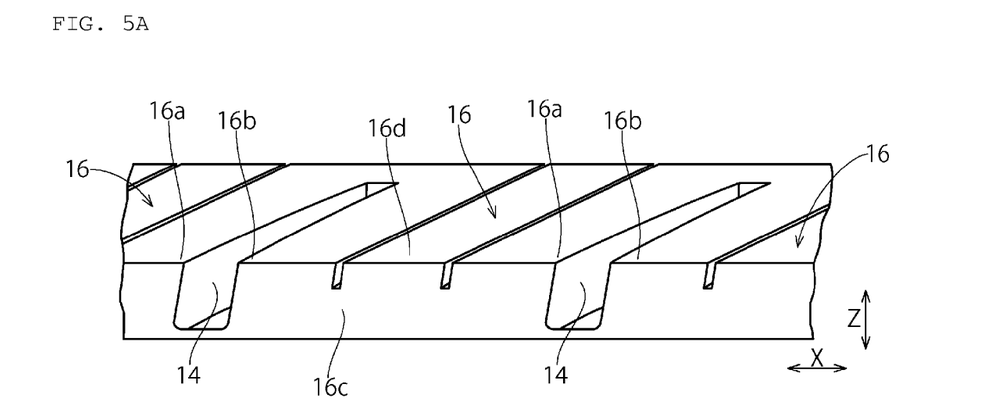
FIG. 5A is a perspective view of land portions of a pneumatic tire according to a comparative example.
Figure 5B:
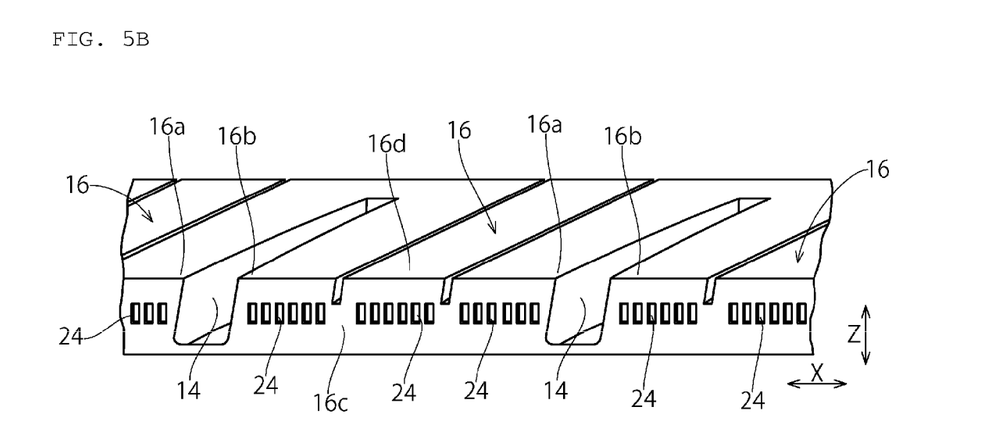
FIG. 5B is a perspective view of land portions of a pneumatic tire according to another comparative example.
Figure 5C:
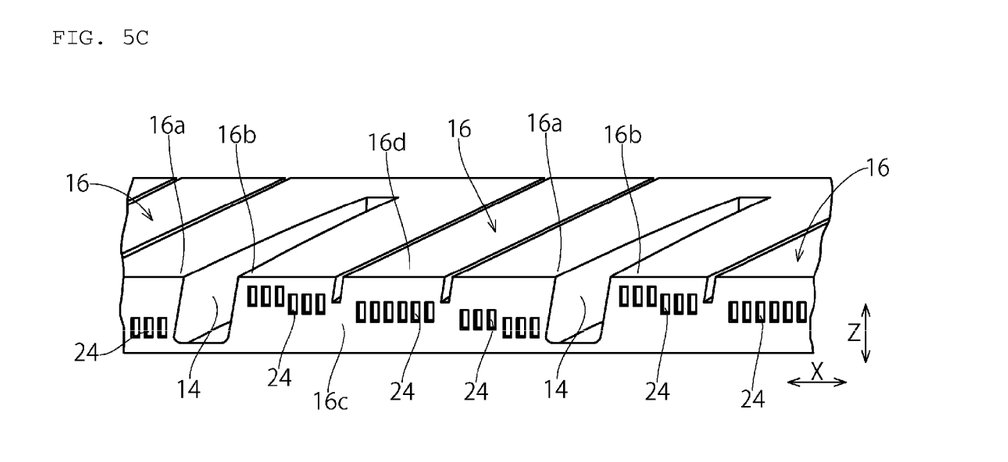
FIG. 5C is a perspective view of land portions of a pneumatic tire according to still another comparative example.

As an example 1, a pneumatic tire where holes 24 shown in FIG. 2 are formed in the side wall 16c of the land portion 16 was manufactured. As examples 2 to 4, pneumatic tires shown in FIG. 4A to FIG. 4C where holes 24 are formed respectively were manufactured. As examples 5, 6, pneumatic tires where only a depth d of holes 24 is changed from a depth d of holes 24 of the example 1 were manufactured. As a comparative example 1, a pneumatic tire where no holes are formed in a side wall 16c of a land portion 16 as shown in FIG. 5A was manufactured. As a comparative example 2, a pneumatic tire where holes 24 are formed at the same position in the depth direction Z as shown in FIG. 5B was manufactured. As a comparative example 3, a pneumatic tire where holes 24 formed on an acute angle portion 16b side of a land portion 16 are arranged closer to a ground contact surface 16d of the land portion 16 than holes 24 formed on an obtuse angle portion 16a side of the land portion 16 as shown in FIG. 5C was manufactured. Respective sizes of the holes 24 and the main grooves 12a, 12c formed in the pneumatic tires of the examples 1 to 6 and the comparative examples 1 to 3, and a ratio (T/S) of a total opening area T consisting of areas of the holes 24 formed in a side wall 16c of the land portion 16 to an area S of the side wall 16c of the land portion 16 are shown in Table 1.

The above-mentioned respective performance evaluations were made with respect to the pneumatic tires of the examples 1 to 6 and the pneumatic tires of the comparative examples 1 to 3, and the results of the performance evaluations are shown in Table 1.

TABLE 1

|  | comparative example 1 | comparative example 2 | comparative example 3 | example 1 | example 2 | example 3 | example 4 | example 5 | example 6 |
|---|---|---|---|---|---|---|---|---|---|
| width W of main groove (mm) | 10.0 | 10.0 | 10.0 | 10.0 | 10.0 | 10.0 | 10.0 | 10.0 | 10.0 |
| depth D of main groove (mm) | 9.0 | 9.0 | 9.0 | 9.0 | 9.0 | 9.0 | 9.0 | 9.0 | 9.0 |
| height h of hole (mm) | — | 1.6 | 1.6 | 1.6 | 3.0 | 1.0 | 2.0 | 1.0 | 1.6 |
| width w of hole (mm) | — | 0.6 | 0.6 | 0.6 | 1.0 | 3.0 | 2.0 | 0.6 | 0.6 |
| depth d of hole (mm) | — | 0.5 | 0.5 | 0.5 | 0.5 | 0.5 | 0.5 | 0.3 | 2.0 |
| cross-sectional area of elongated hole (mm$^2$) | — | 1.0 | 1.0 | 1.0 | 3.0 | 3.0 | 4.0 | 0.6 | 1.0 |
| S/T | — | 0.07 | 0.07 | 0.07 | 0.15 | 0.07 | 0.10 | 0.04 | 0.07 |

TABLE 1-continued

|  | comparative example 1 | comparative example 2 | comparative example 3 | example 1 | example 2 | example 3 | example 4 | example 5 | example 6 |
|---|---|---|---|---|---|---|---|---|---|
| heel-and-toe wear amount | 100 | 100 | 92 | 105 | 105 | 104 | 105 | 105 | 104 |
| air columnar resonance sound | 100 | 108 | 108 | 108 | 110 | 107 | 107 | 105 | 109 |

From the result shown in Table 1, it is understood that uneven wear resistance performance and noise performance of the pneumatic tires of the examples 1 to 6 were enhanced compared with the pneumatic tires of the comparative examples 1 to 3.

What is claimed is:

1. A pneumatic tire provided with a plurality of main grooves extending along the tire circumferential direction, lateral grooves extending in the direction inclined with respect to the tire width direction, and land portions partitioned by the main grooves and the lateral grooves on a tread portion, wherein
the land portion includes an obtuse angle portion defined at an obtuse angle by the main groove and the lateral groove, and an acute angle portion defined at an acute angle by the main groove and the lateral groove,
a plurality of holes are formed in a side wall of the land portion facing the main groove at intervals in the tire circumferential direction, and
the holes formed on an obtuse angle portion side are arranged at positions closer to a ground contact surface of the land portion than the holes formed on an acute angle portion side,
wherein among the plurality of holes a first set of holes are arranged adjacent to each other in the tire circumferential direction and at the same position in the depth direction of the main groove, and a second set of holes are arranged in a stepwise manner towards the ground contact surface in a direction from the acute angle portion of the land portion to the obtuse angle portion of the land portion.

2. The pneumatic tire according to claim 1, wherein the hole is arranged in an overlapping manner with at least a portion of the hole arranged adjacent to the hole in the tire circumferential direction in the depth direction of the main groove.

3. The pneumatic tire according to claim 1 or 2, wherein the hole has an elongated hole shape whose size in the depth direction of the main groove is larger than a size in the tire circumferential direction.

4. The pneumatic tire according to claim 1, wherein a ratio (T/S) of a total area T of areas of the holes formed in the side wall of the land portion to an area S of the side wall of the land portion in which the holes are formed is set to 0.03 or more and 0.2 or less.

5. The pneumatic tire according to claim 1, wherein the land portion includes sipes arranged parallel to the lateral groove, and
the holes are formed so as to avoid positions where the holes overlap with the sipes in the tire circumferential direction.

6. The pneumatic tire according to claim 1, wherein the holes are formed to not contact the ground contact surface of the land portion.

7. The pneumatic tire according to claim 1, wherein the land portions partitioned by the main grooves and the lateral grooves are partitioned into shoulder regions and center regions, wherein the center regions are sandwiched between the shoulder regions.

8. The pneumatic tire according to claim 7, wherein in the center regions, the land portions are formed in such a state where an outer side of the land portion is arranged in the tire width direction in a divided manner by the lateral grooves, and an inner side of the land portion is formed contiguously in the tire width direction.

* * * * *